US005306423A

United States Patent [19]

Hultsch

[11] Patent Number: 5,306,423

[45] Date of Patent: Apr. 26, 1994

[54] DISCONTINUOUSLY OPERATING FILTER CENTRIFUGE WITH NONINVERTING FILTER BAG

[75] Inventor: Günter Hultsch, Oberschleissheim, Fed. Rep. of Germany

[73] Assignee: Krauss-Maffei Aktiengesellschaft, Munich, Fed. Rep. of Germany

[21] Appl. No.: 954,152

[22] Filed: Sep. 30, 1992

[30] Foreign Application Priority Data

Oct. 1, 1991 [DE] Fed. Rep. of Germany ....... 4132715

[51] Int. Cl.[5] .............................................. B01D 33/06

[52] U.S. Cl. .................................... 210/232; 210/370; 210/380.3; 494/36; 494/38; 494/48; 494/64

[58] Field of Search ........................ 494/36, 38, 39, 41, 494/44, 45, 47, 48, 50, 64; 210/369, 370, 380.3, 232, 373, 380.1

[56] References Cited

U.S. PATENT DOCUMENTS

| | | | |
|---|---|---|---|
| 1,292,758 | 1/1919 | Gonzalez | 210/370 |
| 2,688,436 | 9/1954 | Melaven | 494/38 |
| 3,438,500 | 4/1969 | Pico | 210/370 X |
| 3,623,613 | 11/1971 | Quetsch | 210/370 |
| 4,193,874 | 3/1980 | Gerteis | 210/370 X |
| 4,269,711 | 5/1981 | Gerteis | 210/370 X |
| 4,944,874 | 7/1990 | Kobayashi et al. | 210/370 X |
| 5,004,540 | 4/1991 | Hendricks | 210/370 X |
| 5,092,995 | 3/1992 | Gerteis | 210/232 |
| 5,169,525 | 12/1992 | Gerteis | 210/232 |

FOREIGN PATENT DOCUMENTS

| | | | |
|---|---|---|---|
| 1432812 | 8/1969 | Fed. Rep. of Germany | 494/36 |
| 3106022 | 9/1982 | Fed. Rep. of Germany | 494/36 |
| 3430507 | 2/1986 | Fed. Rep. of Germany | 494/36 |
| 3520134 | 12/1986 | Fed. Rep. of Germany | 494/36 |
| 9204982 | 4/1992 | World Int. Prop. O. | 494/50 |

*Primary Examiner*—Harvey C. Hornsby
*Assistant Examiner*—Charles Cooley
*Attorney, Agent, or Firm*—Herbert Dubno

[57] ABSTRACT

A discontinuously operated filter centrifuge has its noninverting filter bag attached only to the filter bottom which is displaceable out of the filter drum, so that when the filter bag is displaced out of the filter drum, a clearance is provided between the filter bag and drum to enable inspection of the interior of the drum.

13 Claims, 5 Drawing Sheets

DISCONTINUOUSLY OPERATING FILTER CENTRIFUGE WITH NONINVERTING FILTER BAG

FIELD OF THE INVENTION

My present invention relates to a discontinuously operating filter centrifuge and, more particularly, to a filter centrifuge in which the filter cake is collected in a filter bag within the centrifuge drum and the filter bag is displaceable out of the drum.

BACKGROUND OF THE INVENTION

A filter centrifuge of the kind in which a filter bag is inverted to discharge the filter cake is described, for example, in German Patent Document DE-OS 27 09 894. Here the discharge of the filter cake from the drum is effected automatically by axially shifting a bottom provided within the drum and connected by pins with a cover which closes the mouth of the drum and the filtration space during filtration. For discharge of the filter cake, the bottom and the cover are shifted into the solids housing, the filter bag is inverted and, after discharge of the filter cake, the filter bag is withdrawn back into the drum. In this construction the rear end of the filter bag is attached to a shiftable bottom and the filter bag is also attached to the drum shell.

In order to invert the filter bag, the total displacement must be twice the length of the drum. During the inversion of the filter bag the material of the bag is subjected to a high degree of mechanical loading. Because the stroke of the apparatus must be twice the length of the filter bag and the drum and a minimum filter bag length is substantial for effective filtering, the overall length of the machine is considerable and the space required for the machine also high.

It is also not possible to look into the supporting sieve or screen of the drum against which the filter bag must rest during the filtration since the filter bag is connected with the drum end and thus this arrangement does not allow inspection of the drum interior during inversion or discharge of the filter cake.

OBJECTS OF THE INVENTION

It is, therefore, the principal object of the present invention to provide a discontinuously operating filter centrifuge of the type in which a filter bag is supported in a centrifuge drum during the filter operation and the filter cake is discharged at least in part by an advance of the bottom which is movable in the drum toward the mouth thereof, whereby drawbacks of the earlier system are avoided.

More particularly, it is an object of the invention to provide a filter centrifuge of this type which has a shorter overall construction for a filter bag of a given length.

Another object of the invention is to provide an improved filter centrifuge of this kind so that inspection of the interior of the drum is facilitated.

SUMMARY OF THE INVENTION

These objects and others which will become apparent hereinafter are attained, in accordance with the invention in a filter centrifuge in which a centrifuge drum which allows discharge of liquid from a filter cake is rotatable about a drum axis, a filter bag is received in the drum and is attached to a bottom displaceable toward the mouth of the drum, and the filter bag is attached exclusively to this bottom and with this bottom together with the filter cake is displaced so that the filter bag is shifted out of the mouth of the drum for discharge of the filter cake beyond the mouth of the drum, thereby enabling the interior of the drum to be inspected.

According to a feature of the invention, the bottom and the filter bag are displaceable with respect to the drum by at least the length of the filter bag.

The drum may frustoconically diverge toward its mouth or open end and the conical widening of the drum may have a transition into a cylindrical or oppositely converging conical inner surface just before this open end.

Means can be provided to enable inspection of the interior of the drum, the cleaning of the latter and ready replacement of the filter bag upon displacement of the bottom out of the drum sufficiently to allow these operations.

According to a feature of this invention a tool may be provided axially ahead of the mouth of the drum in the direction in which the sack or bag is displaced out of the latter for radial engagement with the bag from an outer position inwardly so that the engaged region of the filter bag shifted from the drum can be deflected to release the filter cake.

According to the another feature of the invention, coupled with the bottom, parallel thereto and with an axial spacing from the bottom, a cover can be provided which is formed at its periphery with an elastic sealing ring engageable with the mouth of the drum upon retraction of the sack into the latter. This sealing ring can be flat, but preferably has a circular or rounded profile at its periphery and/or is formed as a tube at least partially filled with a liquid.

According to a feature of the invention the cover can also be provided with a sealing ring engageable with an inner surface with the end of the drum directly.

The filter bag can be formed by overlapping segments interconnected by stitch seams which are shorter in length than the filter bag to leave one or both ends of the filter bag free from the stitch seam.

The bottom, cover and drum can be hermetically sealed and a seal can be provided between the cover and a nonrotatable filling tube opening into the interior of the sack, as well, so that the interior of the sack is substantially pressure tight and a subatmospheric pressure or suction can be generated within the sack for, for example, pressurized operation of the centrifuge.

More particularly, the filter centrifuge of the invention comprises:

a housing;

a centrifuge drum rotatable about an axis in the housing, the housing being provided with means for collecting a liquid centrifugally expelled by rotation of the drum;

means for rotating the drum in the housing;

a filter bag in the housing rotatable with the drum and adapted to receive a filter cake upon centrifugal expulsion of liquid from a suspension introduced into the filter bag through the filter bag and from the drum;

a bottom axially movable in the drum, the filter bag being secured only to the bottom; and means for axially shifting the bottom relative to the drum to displace the filter bag out of a mouth of the drum and form a clearance between the filter bag and the drum through which an interior of the drum can be inspected.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
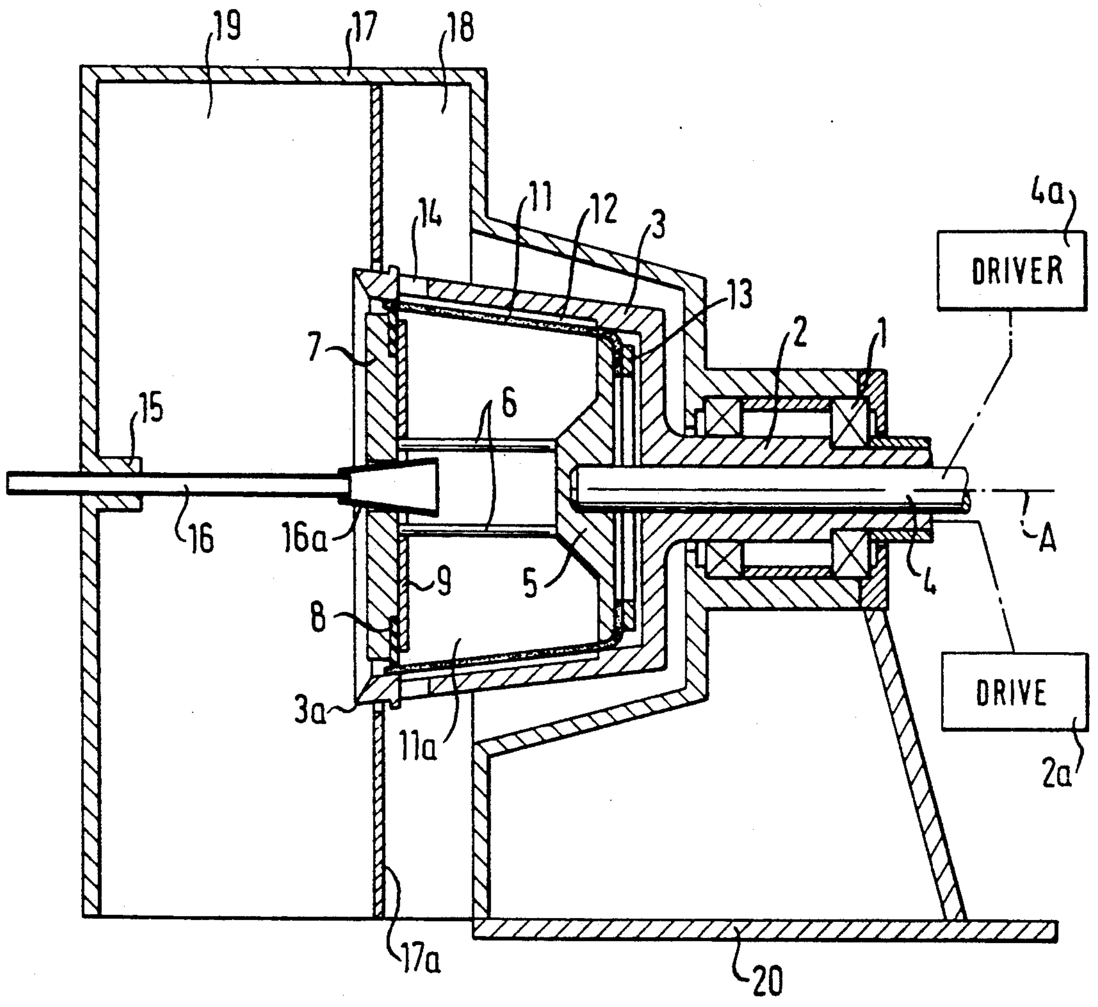
FIG. 1 is a highly diagrammatic axial cross sectional view of a filter centrifuge embodying the principles of this invention.

In FIG. 1 of the drawing I have shown a filter centrifuge according to the invention in which a bearing assembly 1 in the housing 17 of the filter centrifuge journals a hollow shaft 2 carrying a centrifuge drum 3 and receives an axially shiftable core shaft 4. The latter is displaceable by an actuating means or driver 4*a* and the shaft 2 is rotatable by a centrifuge drive 2*a* both diagrammatically represented in the drawing.

The centrifuge drum 3 is slightly tapered and has a mouth 3*a* open in a solids collecting space 19 of the housing separated by a partition 17*a* from a liquid collecting space 18 surrounding a portion of the drum 3 provided with filtrate bores 14 from which the filtrate is discharged.

At a front end of the shaft 4, a bottom 5 is mounted and this bottom 5 is connected by pins 6 angularly equispaced about the centrifuge axis A with a bottom cover or plate 7 which is parallel to and axially spaced from the bottom 5.

A peripheral sealing ring 8, here shown as a flat annular disk, is held against the plate 7 by a disk 9 and engages the mouth of the drum 3 via the rim of a fabric filter bag 11 which can be clamped by the seal 8 against the inner wall of the filter drum 3.

The filter bag 11 is secured to the bottom 5 by a ring 13 so that the bottom closes one end of a filter space 11*a* provided within the filter bag and the drum 3. A multiplicity of grooves or flutes 12 along the inner wall of the drum 3 provide liquid passages enabling the liquid centrifugally displaced through the filter bag 11 to pass to the bores 14. The grooves or flutes 12 lie along generatrices of the drum 3.

The housing 17 is further provided with a sleeve 15 in which a filling tube 16 is received. The filling tube opens through a distributor 16*a* in the plate 7, into the compartment 11*a* in order to discharge the suspension into the filter bag. The distributor 16*a* may sealingly engage the tube 16 so that the space 11*a* can be hermetically sealed when the filtering is to be carried out under pressure as may be required or desirable in some instances.

As noted, a housing 17 also has the filtrate chamber 18 and a solids collection chamber 19 which open separately downwardly and can be provided with means enabling filtrate and the filter cake to be carried off. The housing 17 together with the bearing assembly 1 is mounted upon a base plate 20.

Figure 2:
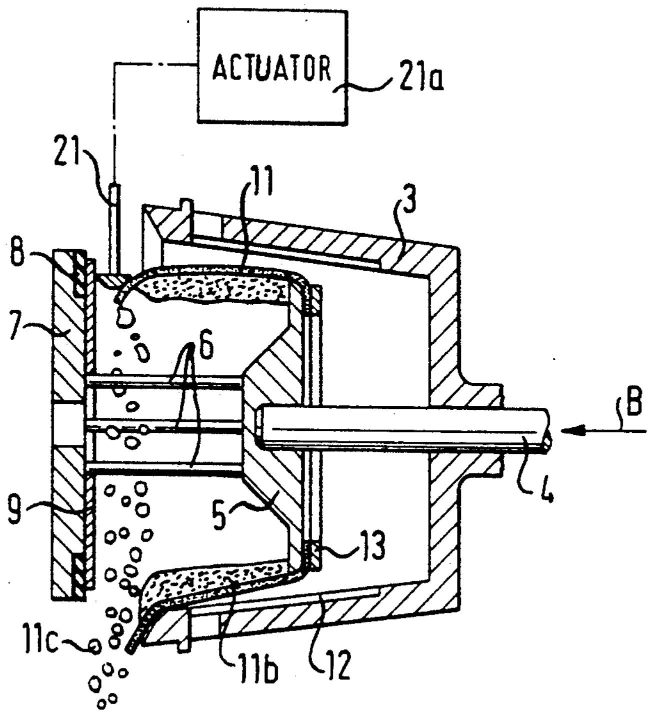
FIG. 2 is a diagram illustrating the stage in the operation of the filter centrifuge in which the filter bag is partly displaced out of the filter drum.

As can be seen from FIG. 2, the filter bag 11 is affixed only to the bottom 5 which can be moved with the shaft 4, actuated by the driver 4*a* in the direction of arrow B to displace the filter bag, the cover plate 7 to which the bag is not attached, and the filter cake within the bag to the left out of the drum 3. When the filter bag projects beyond the drum, it can be engaged by a tool 21 which can be displaced radially inwardly to engage the filter bag which can be rotated with the shaft 4 and the drum 3 so that the filter cake 11*b* can be dislodged as is clear from the cascading pieces 11*c* of the filter cake. The actuator for the tool 21 is represented at 21*a*. A common programmed controller can operate the elements 2*a*, 4*a* and 21*a*.

Figure 3:
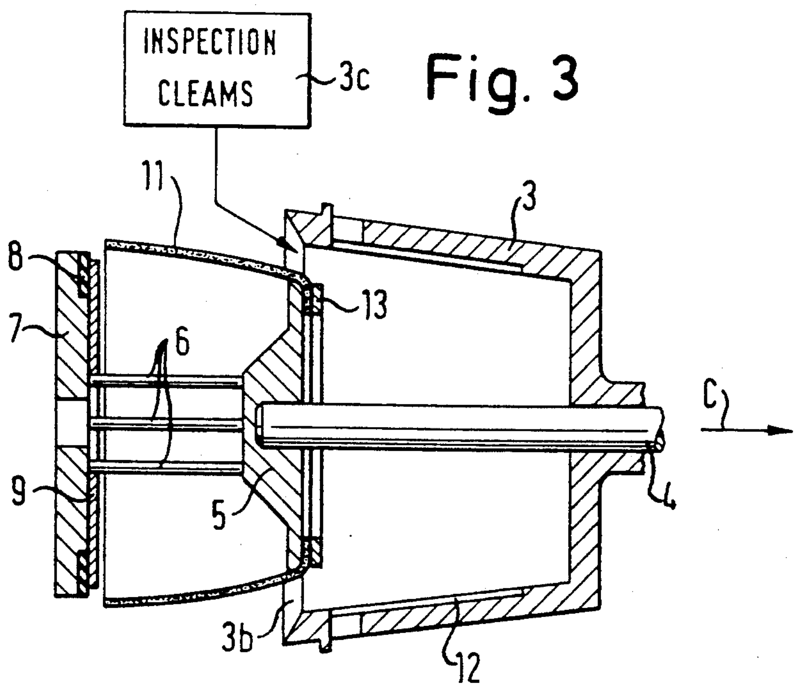
FIG. 3 is another cross sectional view showing the filter bag fully out of the drum and able to be retracted, but in a position in which inspection or cleaning of the drum is possible and wherein the filter bag is slightly rotated so as to be spread out.

FIG. 3 shows the empty filter bag before it is about to be retracted into the drum in the direction of arrow C by the driver 4*a*. Under these conditions a clearance 3*b* is provided between the bottom 5 and the drum through which the drum can be inspected and flushed or otherwise cleaned as represented by the inspection and cleaning unit 3*c* (FIG. 3).

Figure 4:
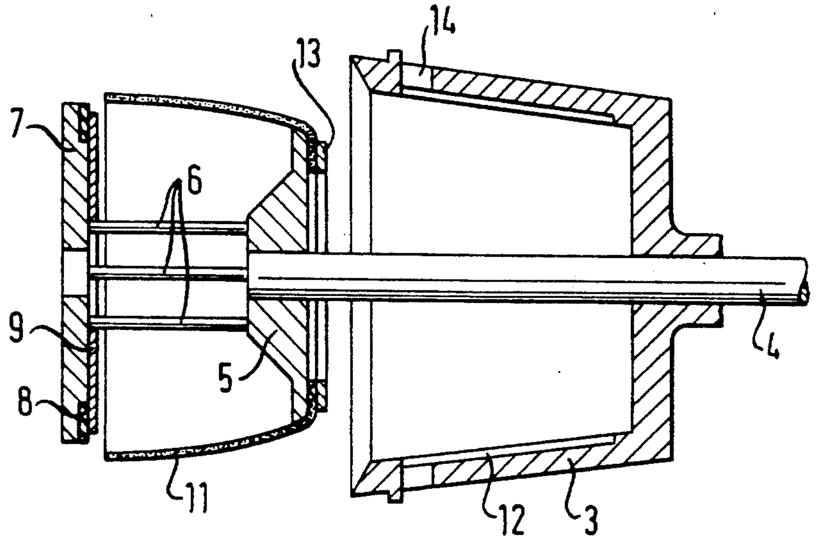
FIG. 4 is a view similar to FIG. 3 but with the filter bag extending further from the drum.

Referring to FIG. 4, it can be seen that the driver 4*a*, the shaft 4 and the bottom 5 can be so provided that the bag 11 and the bottom 5 can be moved still further out of the drum if desired or required.

Figure 5:
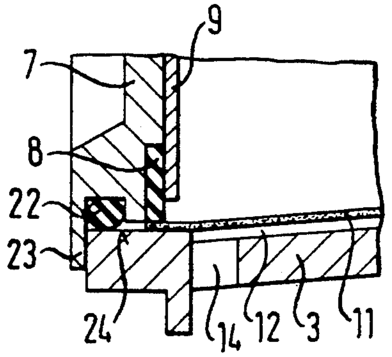
FIG. 5 is a detail view of a sealing assembly between the periphery of the cover and the drum.

FIG. 5 shows that the plate 7, in addition to having the flat sealing ring which engages the free end of the bag 11 when the bag is withdrawn into the drum 3 and capable of clamping the bag 11 against the mouth of the drum 3, can also carry a circular sealing ring 22 which can engage a metallic inner surface 24 forming the mouth of the drum and possibly having a slight conical convergence in the direction opposite that of the drum, i.e. to the left. The sealing ring 22 can be a rubber O-ring if desired.

Figure 6:
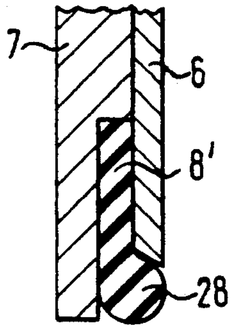
FIG. 6 is a detail section showing one embodiment of a peripheral seal for the cover.
Figure 7:
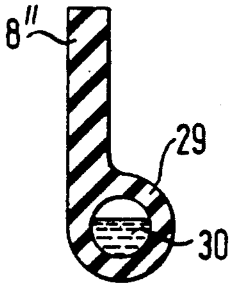
FIG. 7 is a cross section view showing another embodiment thereof.

FIG. 6 shows another configuration of the flat sealing disk 8′ clamped between the plate 7 and the disk 9. In this embodiment the periphery of the seal has a circular or rounded bulge 28 to effect the sealing. The bulge 29 of the corresponding ring 8″ (FIG. 7) can be tubular and can be partially filled with liquid 30, which is centrifugally displaced outwardly to promote the sealing action by enhanced centrifugal force as will be described below.

The means 4*a* for axially shifting the bottom 5 and the filter bag 11, can be a fluid pressure operated piston and cylinder assembly or a threaded spindle arrangement.

The filter centrifuge illustrated in the drawing operates as follows.

Initially the drum 3 with the bag 11 fully received therein is accelerated to its full speed. Centrifugal force thus spreads the filter bag 11 against the wall for the drum and the elastic sealing ring 8 is stretched outwardly to press against the open end of the filter bag.

Through the filling pipe 16 the suspension of a solid in a liquid is introduced into the drum and the filter cake is formed therein by centrifugal discharge of the liquid phase. When the filtering is complete, the filter cake can be washed or flushed with a liquid, vapor or gaseous medium, e.g. water or steam. The centrifuge is rotated at centrifugation speeds during this stage as well.

The filter cake is then dried, e.g. by the introduction of a gas under pressure, superheated steam or the like and, as described previously, the filter compartment can be made pressure tight and pressurizable for this purpose. After intensive drying with continued rotation of the drum, the speed of the drum is reduced to lower the centrifugal acceleration applied to the contents of the drum to substantially 0 to 30 $m/s^2$. At this reduced centrifugal acceleration, the sealing ring 8 contracts and thus is lifted from the filter bag 11. The core shaft 4 is advanced as shown in FIG. 2 with the bottom 5, the cover 7, the filter bag 11 and the filter cake which has collected thereon, out of the drum. By gravity and deflection by the tool 21, the filter bag 11 bends downwardly to break up the filter cake and allow it to deposit into the solids compartment or chamber 19. The drum speed should be such that the solids are not thrown against the housing walls and contamination of the housing walls is avoided.

The tool 21 can be a skid or roller pressed against the filter bag to support this dislodging of the filter cake. For emptying of the filter cake, moreover, the filter bag can be moved back and forth several times past the tool 21 and/or the tool can be oscillated or vibrated. When the tool is formed with a roller, that roller can be eccentrically journaled on the tool and/or provided with a profile designed to generate vibrations to promote the discharge of the filter cake. If desired a plurality of such tools can be provided and these tools can be offset angularly about the axis A or axially along the axis to engage the filter bag 11. Other means such as compressed air can be used to dislodge the filter cake and clean the filter bag.

Prior to retraction of the bag into the drum and its closure by the cover 7, the speed of the drum can be raised sufficiently to ensure that the filter bag will assume a rounded bottle or barrel shaped configuration (FIG. 3). It suffices for this purpose to provide a centrifugal acceleration, for example, 50 to 100 $m/s^2$ so that during this action the fabric of the filter bag will not be excessively stressed mechanically.

Upon retraction of the filter bag into the drum the filter bag will receive from the inner surface of the drum its original shape and can be engaged by the seal 8 once again. A slight conical divergence of the drum in the direction of its mouth facilitates the displacement insertion of the bag out of the drum and its retraction into the drum.

In the wall of the drum, a support can be provided for the bag, e.g. in the form of a sieve having coaxial gaps, or the like if the flutes or grooves 12 are not used, to allow the filtrate to flow to the bores 14. Furthermore, between the filling tube 16 and the cover 7, the seal described previously can be provided, preferably in the form of a rotary seal, to enable the filtration space to be hermetically sealed and the filling tube 16 used to deliver a gaseous pressurizing agent for simultaneous pressure and centrifugal filtration.

It has been pointed out also that the shaft 4 and the bottom 5 should be so shiftable from the drum that access to the interior of the drum is ensured to allow inspection and cleaning of the drum by conventional means. In this position (FIG. 4) the filter bag 11 can be replaced if necessary.

As has been previously mentioned also, ahead of the rotatable sealing ring 8, 8′ or 8″, an additional circular cross section seal 22 is provided which can additionally seal with the cover 7 and an inner surface 24 of the drum provided ahead of the bores 14. This has been found to prevent draining of the fabric beneath the sealing ring 8 into the solids chamber 19. The surface 24 can be cylindrical but preferably is slightly conically convergent to the left, i.e. in the direction opposite the convergence of the drum 3.

The cover 7 can also have an abutment ring 23 which can engage the mouth of the drum and which can fix the positions of the seals 8 and 22 relative to the latter.

To increase the pressing force of the sealing ring 8 against the open end of the bag 11, it is advantageous to provide the outer region of the seal with a circular cross section bulge 28 or with a tube 29 which can be at least partially filled with liquid 30.

Figure 8:
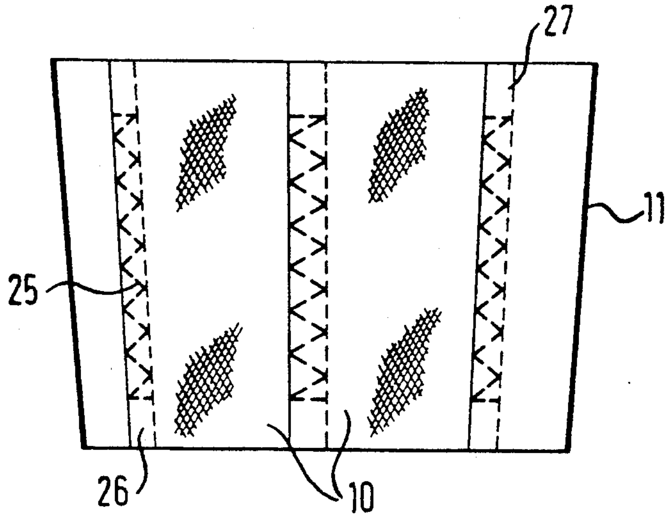
FIG. 8 is an elevational view of a filter bag according to the invention.
Figure 9:
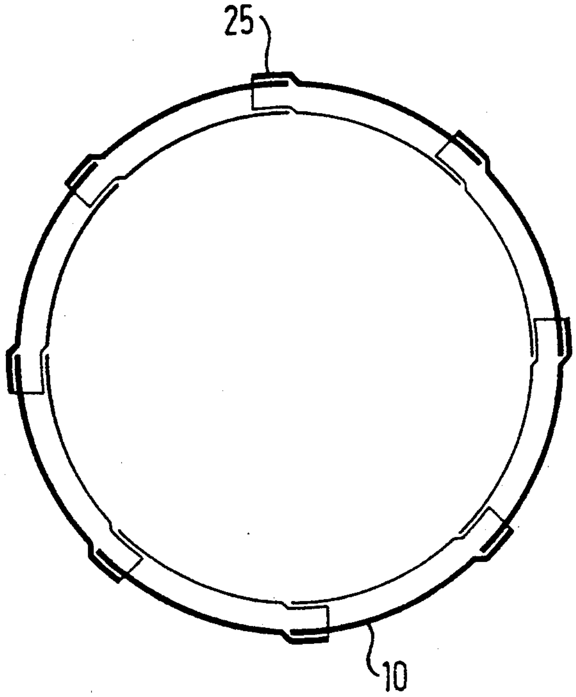
FIG. 9 is an end view of this filter bag.

In the sealing region, the filter bag 11 should have only a limited diameter tolerance with respect to its supporting surface of the drum and for this purpose the segments 10 of fabric of the drum, which are stitched together with stitch means 25, can overlap (see FIGS. 8 and 9), to enable the bag to match the diameter of the supporting surface of the drum more readily. The regions in which the bag are held against the drum are such that they are free from the stitch seams which are shorter than the bag and thus enable this matching or compression more readily.

I claim:

1. A filter centrifuge, comprising: a housing;

a centrifuge drum rotatable about an axis in said housing, said housing being provided with means for collecting a liquid centrifugally expelled by rotation of said drum;

means for rotating said drum in said housing;

a filter bag in said housing rotatable with said drum and adapted to receive a filter cake upon centrifugal expulsion of liquid from a suspension introduced into said filter bag, said liquid passing through said filter bag into said drum and being discharged from said drum;

a bottom axially movable in said drum, said filter bag being secured only to said bottom and having a mouth located at a mouth of said drum during formation of said cake; and means for axially shifting said bottom relative to said drum in a direction to displace said filter bag out of said mouth of said drum and form a clearance between said filter bag and said drum, and for shifting said mouth of said bag in said direction away from the mouth of said drum through which an interior of said drum can be inspected.

2. A filter centrifuge as defined in claim 1 wherein said bottom is provided with a shaft for axially displacing said bottom and said filter bag by an amount at least equal to the length of the filter bag.

3. A filter centrifuge as defined in claim 1 wherein said drum conically widens toward said mouth.

4. A filter centrifuge as defined in claim 1 wherein said bottom is provided with a shaft for axially displacing said bottom out of said drum by a distance sufficient to allow inspection and cleaning of the drum and to enable replacement of the filter bag.

5. A filter centrifuge as defined in claim 1, further comprising a cover connected to but axially spaced from said bottom and having an elastic sealing ring.

6. A filter centrifuge as defined in claim 5 wherein said elastic sealing ring is formed on its periphery with a rounded cross section.

7. A filter centrifuge as defined in claim 5 wherein said sealing ring has a tubular periphery at least partially filled with a liquid.

8. A filter centrifuge as defined in claim 5 further comprising a circular cross section sealing member on said cover directly engageable with an inner surface of said drum at said mouth.

9. A filter centrifuge as defined in claim 1 wherein said bag is formed from a plurality of overlapping segments interconnected by stitch seams.

10. A filter centrifuge as defined in claim 9 wherein said stitch seams are shorter than the length of said bag and terminate inwardly of at least one end of said bag.

11. A filter centrifuge as defined in claim 1 further comprising seal means between said drum and a nonrotatable feed tube opening into said drum for the delivery of a pressured gas thereto.

12. A filter centrifuge, comprising: a housing;

a centrifuge drum rotatable about an axis in said housing, said housing being provided with means for collecting a liquid centrifugally expelled by rotation of said drum;

means for rotating said drum in said housing;

a filter bag in said housing rotatable with said drum and adapted to receive a filter cake upon centrifugal expulsion of liquid from a suspension introduced into said filter bag, said liquid passing through said filter bag into said drum and being discharged from said drum;

a bottom axially movable in said drum, said filter bag being secured only to said bottom; and means for axially shifting said bottom relative to said drum to displace said filter bag out of a mouth of said drum and form a clearance between said filter bag and said drum through which an interior of said drum can be inspected, said drum conically widening toward said mouth, said drum being provided with an inner surface meeting a conically widening portion of said drum at said mouth of said drum and forming an oppositely convergent frustoconical inner surface.

13. A filter centrifuge, comprising: a housing;

a centrifuge drum rotatable about an axis in said housing, said housing being provided with means for collecting a liquid centrifugally expelled by rotation of said drum;

means for rotating said drum in said housing;

a filter bag in said housing rotatable with said drum and adapted to receive a filter cake upon centrifugal expulsion of liquid from a suspension introduced into said filter bag, said liquid passing through said filter bag into said drum and being discharged from said drum;

a bottom axially movable in said drum, said filter bag being secured only to said bottom;

means for axially shifting said bottom relative to said drum to displace said filter bag out of a mouth of said drum and form a clearance between said filter bag and said drum through which an interior of said drum can be inspected: and at least one tool bearing radially upon said filter bag in a region in which said filter bag extends out of said drum and displacing said filter cake.

* * * * *